United States Patent [19]

McCartney et al.

[11] Patent Number: 5,164,847

[45] Date of Patent: Nov. 17, 1992

[54] HOLOGRAPHIC ELEMENT

[75] Inventors: David J. McCartney; Giles R. Chamberlin, both of Suffolk, England

[73] Assignee: British Telecommunications plc, United Kingdom

[21] Appl. No.: 717,219

[22] Filed: Jun. 20, 1991

[30] Foreign Application Priority Data

Jun. 21, 1990 [GB] United Kingdom ............... 9013854

[51] Int. Cl.⁵ .............................................. G03H 1/04
[52] U.S. Cl. ......................................... 359/1; 359/30; 430/2
[58] Field of Search ................. 359/1, 3, 30, 584, 589, 359/590; 430/1, 2

[56] References Cited

U.S. PATENT DOCUMENTS 3,552,853  1/1971  Sanders et al. .
3,975,082  8/1976  Winzer .
4,508,420  4/1985  Nishiwaki ............................. 359/3

FOREIGN PATENT DOCUMENTS 0168179    1/1986   European Pat. Off. .
WO88/05175 7/1988   PCT Int'l Appl. .
1215773   12/1970   United Kingdom .
1397447    6/1975   United Kingdom .
2234605A   2/1991   United Kingdom .

OTHER PUBLICATIONS

Micheron et al., "High Photosensitivity Volume Hologram Recording Bi12SO20 and B12GeO20 by Efficient Charge Transfer Process", Optics Communications, Jul. 1976, vol. 18, No. 2, pp. 216 to 217.

Huignard et al., "Coherent Selective Erasure of Superimposed Volume Holograms in LiNbO₃", Applied Physics Letters, Mar. 1, 1975, vol. 26, No. 5, pp. 256 to 258.

Herwig Kogelnik, "Coupled Wave Theory for Thick Hologram Gratings", Bell System Technical Journal, Nov. 1969, vol. 48, No. 9, pp. 2909 to 2947.

Patent Abstracts of Japan, vol. 7, No. 245 (P-233)[1390], Oct. 29, 1983; & JP-A-58 132 271 (Dainippon Insatsu K.K.).

Applied Optics, vol. 26, No. 10, May 15, 1987, pp. 1983-1988, Optical Society of America; H. Chen et al: "Design of a Holographic Lens for the Infrared".

Patent Abstracts of Japan, vol. 6, No. 248 (P-160)[1126], Dec. 7, 1982; & JP-A-57 146 283 (Fujitsu K.K.).

Soviet Inventions Illustrated, week 9006, Mar. 21, 1990, accession No. 90-042484/06, Derwent Publications Ltd. London, GB; & SU-A-1195 815 (As Geor. Phys. Inst.).

Patent Abstracts of Japan, vol. 13, No. 231 (P-878)[3579], May 29, 1989; & JP-A-1 40 878 (Canon, Inc.).

Primary Examiner—Bruce Y. Arnold
Assistant Examiner—Martin Lerner
Attorney, Agent, or Firm—Nixon & Vanderhye

[57] ABSTRACT

A transmission holographic element (30) comprises a holographic material (330) deposited onto a substrate (31) to form a composite substrate structure. The substrate (31) is coated with a mirror coating (32) prior to the deposit of the holographic material (33) which is reflecting at the reading wavelength and non-reflecting at the recording wavelength. This allows the use of substrates that need not be of good optical quality because when the holographic element is exposed to light at the reading wavelength, light is reflected by the mirror coating before passing through the substrate. In addition, the mirror coating is protectred from damage during processing since it is between the substrate (31) and holographic material (33).

14 Claims, 2 Drawing Sheets

HOLOGRAPHIC ELEMENT

BACKGROUND

I. Field of the Invention

This invention relates to a holographic element of the type comprising a substrate absorbent to light of a recording wavelength, and a holographic material which is sensitive to light of a recording wavelength, readable at a reading wavelength and usable to form a volume hologram, the substrate and the holographic material forming a composite substrate structure.

II. Prior Art and Other Considerations

A volume hologram may be formed in the holographic material by exposing the holographic material in a known way to light at the recording wavelength. The holographic element may then be read by exposing the holographic material to light at the reading wavelength.

Holographic elements of this general type are disclosed in more detail in British patent application number GB8917455.1 in the name of the present Applicant to which reference is directed. In holographic elements of this known type, the holographic material is deposited directly onto the substrate. After the holographic material has been exposed to light at the recording wavelength and subsequently developed, a holographic device is formed by laminating the substrate and holographic material to a mirrored cover glass. The mirrored cover glass is fixed to the holographic material and the substrate by means of an adhesive. Typically an epoxy adhesive is used for index matching and humidity protection.

A disadvantage of this known holographic element is that the substrate, generally coloured glass, must be of a very high optical quality while being transmissive at the reading wavelength and absorbent at the recording wavelength. In addition, the mirrored surface of the mirrored cover glass is susceptible to damage during processing.

SUMMARY

According to a first aspect of the invention there is provided a holographic element which is characterized in that the first surface of the substrate has a mirror coating and the holographic material is located adjacent the mirror coating, the mirror coating being reflecting at the reading wavelength and non-reflecting at the recording wavelength.

The volume hologram comprises a grating of fringes formed through exposure from cross beams of radiation at the recording wavelength. The cross beams of radiation are arranged to be incident on the holographic material at an angle to the elements normal of $\theta_0$ and $\theta_1$, respectively.

$\theta_0$ and $\theta_1$ are chosen with reference to the holographic material, and the mirror coating is chosen such that light of the recording wavelength incident at $\theta_0$ and $\theta_1$ is transmitted with high efficiency. The grating fringes in the holographic material will be formed parallel to the bisector where $\theta_0 = (\theta_0 + \theta_1)/2$. In other words, the angle slant of the grating fringes is $\theta_B$.

$\theta_0$ and $\theta_1$ are chosen with reference to the holographic material and $\theta_B$ is chosen such that the light of the reading wavelength $\lambda_R$ incident at $2\theta_B$ to the element normal satisfies the Bragg condition;

$$\lambda_R = 2d \sin \theta_B$$

where d is the distance between grating fringes.

By forming a mirrored surface on the first surface of the substrate, the substrate need not be of a good optical quality. This is because when the holographic element is exposed to light at the reading wavelength, light is reflected by the mirror coating before passing through the substrate. The substrate therefore need only be of good flatness and of good absorptivity at the recording wavelength. In addition, the mirror coating is protected from damage during processing since it is embedded within the composite substrate structure. A further advantage, is that the mirror coating is in close proximity to the volume hologram at a predetermined angle $\theta_B$.

Preferably the mirror coating is a multi-layered dielectric structure. Such a structure enables the mirror coating to be reflective at one wavelength and transmissive at a different wavelength.

Conveniently, the mirror coating behaves as a mirror for incident radiation at the reading wavelength and having an angle of incidence up to about 30°.

Preferably the substrate and the holographic material have substantially the same refractive index and the mirror coating is adapted for use with an incident radiation propagating through the material of this refractive index. This reduces the level of reflection of the interface between the holographic material and the first surface of the substrate and increases the efficiency of the mirror coating.

The holographic material may comprise a silver halide or a photopolymer but preferably it is dichromated gelatin. Dichromated gelatin is sensitive to light in the visible region of the electromagnetic spectrum, specifically light over a wavelength of less than 530 nm. Preferably, when using dichromated gelatin as the holographic material, the recording wavelength used to form the volume hologram is 514 nm. However, other wavelengths such as 488 nm may be used. At 488 nm the available laser power is less than at 415 nm but the material is more sensitive at 488 nm.

The wavelength chosen will depend on the sensitivity range of the material and of the available laser sources.

Conveniently, the reading wavelength is in the infrared region of the electromagnetic spectrum, for example in the range 1200–1600 nm, although other reading wavelengths may be used. The appropriate reading wavelength will be determined by the use for which the holographic element is intended.

A holographic device may be formed comprising a holographic element according to the first aspect of the invention, wherein a volume hologram has been formed in the holographic material, and further comprising a cover glass adjacent the composite substrate structure and attached thereto by adhesive means.

According to a second aspect of the invention, there is provided a method of forming a holographic element of the type comprising a substrate which is transmissive to light as a reading wavelength and having a first surface and a holographic material, the holographic material being sensitive to light of a recording wavelength and readable at the reading wavelength, and used to form a volume hologram in the holographic material, the substrate and the holographic material forming a composite substrate structure, comprising the steps of; coating the first surface of the substrate with a mirror coating which is reflecting at the reading wavelength and non-reflecting at the recording wavelength; and depositing the holographic material on the mirror coating.

Conveniently the method further comprises the steps of:
exposing the holographic element to light at the recording wavelength to form a volume hologram;
processing the holographic element;
placing a cover glass over the composite substrate structure; and
applying an adhesive to this cover glass to fix the cover glass to the composite substrate structure thereby to form a holographic device.

BRIEF DESCRIPTION OF THE DRAWINGS

The invention will now be described by way of example only with reference to the accompanying drawings in which.

DETAILED DESCRIPTION OF THE DRAWINGS

Figure 1:
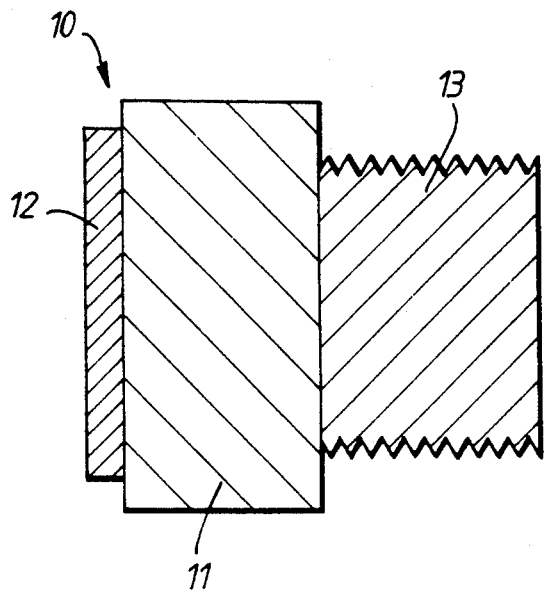
FIG. 1 is a schematic cross-sectional representation of a known holographic element.
Figure 2:
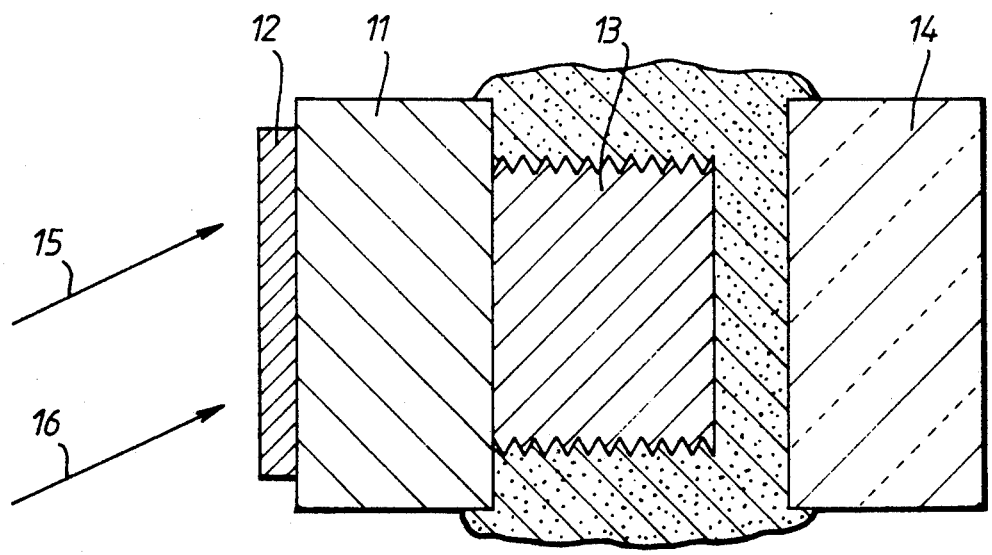
FIG. 2 is a schematic cross-sectional representation of a known holographic device formed from the element of FIG. 1.

Referring to FIG. 1, a known holographic element is indicated generally by the reference (10). The element (10) comprises a substrate (11) which is transparent to light of a reading wavelength and absorbent to light of a recording wavelength. The reading and recording wavelengths can be any suitable wavelength, but in this example the reading wavelength is in the range 1200-1600 nm and the recording wavelength is 514 nm. The substrate (11) has an anti-reflection coating (12) deposited on one surface and a holographic material (13) such as dichromated gelatin, deposited on a second surface of the substrate (11). After exposing the dichromated gelatin (13) to light of 514 nm to form a volume hologram in the dichromated gelatin, a holographic device is formed by laminating the substrate (11) to a mirrored cover glass (14). The device is then read through exposure via the anti-reflection coating (12) on the substrate (11), through the dichromated gelatin (13) of a beam of light at the reading wavelength (15, 16). The light beam (15, 16) is then reflected by the mirrored cover glass (14). The substrate (11) must therefore be of high optical quality and be transmissive at this wavelength.

Figure 3:
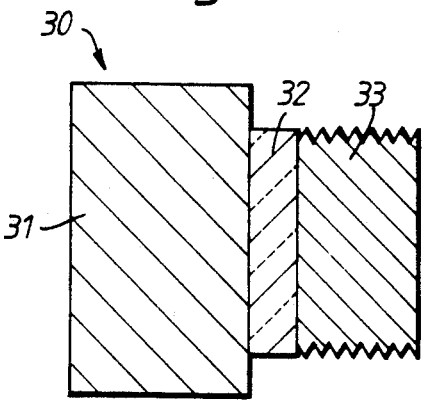
FIG. 3 is a schematic cross-sectional representation of a holographic element according to the present invention.
Figure 4:
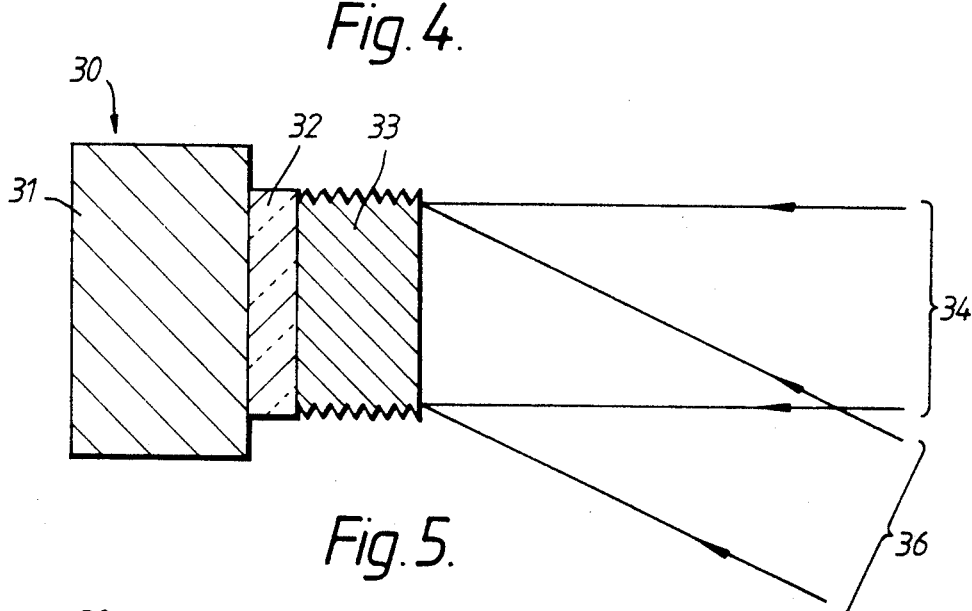
FIG. 4 is a schematic illustration showing the exposure of the holographic element of FIG. 3.

Turning now to FIG. 3, a holographic element (30) according to the present invention is shown. The element (3) comprises a substrate (31) onto which a mirror coating (32) has been deposited. A holographic material (33) comprising dichromated gelatin, is then deposited onto the mirror coating (32) in such a way that the mirror coating (32) is within the composite substrate structure formed from the substrate (30) and the holographic material (33). In order to form a volume hologram in the holographic material (33), the device (30) is exposed to cross beams of radiation at the recording wavelength (34, 36) as shown in FIG. 4.

In this example the recording wavelength is 514 nm because the recording material (33) comprises dichromated gelatin. However, if a different material were used to form the holographic material (33), a different recording wavelength could be used, for example 488 nm, 633 nm or 442 nm. The chosen wavelength will depend upon the sensitivity range of the material and of the available sources.

Figure 6:
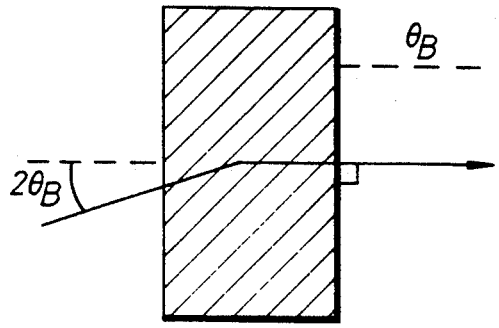
FIG. 6 is a schematic diagram of the volume hologram formed after exposure.
Figure 5:
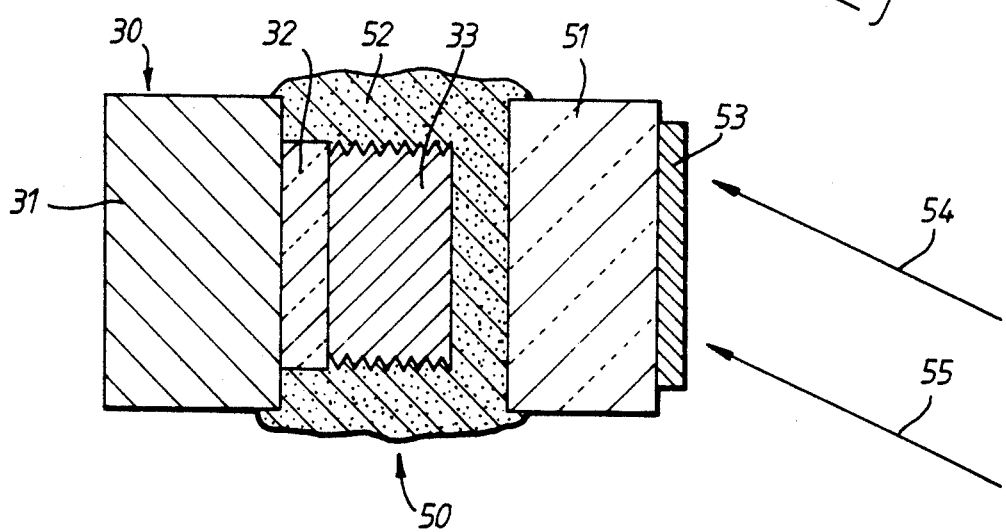
FIG. 5 is a schematic cross-sectional representation of a holographic device formed from the element of FIG. 3 after exposure as shown in FIG. 4.

The beam (34) is incident at an angle of approximately 0° to the normal of the substrate surface, and the beam (36) is incident at an angle of $\theta_1$ of approximately 10°. The volume hologram thus formed comprises a grating of fringes having an angle of slant of $\theta_B$ in the order of 5° and a fringe spacing, k, of about 1.55 $\mu$m (see FIG. 6). Once the volume hologram has been formed in the holographic element (30), a holographic device may be formed as shown in FIG. 5. The holographic device (50) comprises the holographic element of FIG. 4 and a cover glass (51) fixed to the element (30) by means of an adhesive (52). The cover glass (51) is coated with an anti-reflection coating (53). To read the device (50) the device (5) is exposed to light having the wavelength in the range 1200-1600 nm (54, 55).

Incident light of this reading wavelength is incident on the anti-reflection coating (53) at an angle of incidence of up to 30°. The light is then reflected back by the mirror coating (32). Light at the reading wavelength does not pass through the substrate (31) which need not therefore be of good optical quality nor be transmissive at the reading wavelength. The substrate must be of good flatness and have a good absorptivity and the recording wavelength. The mirror coating is typically made of a multi-layer dielectric structure having the following reflective properties, namely, that for an incident medium having a refractive index of 1.51+/−0.01 and for an incident radiation of 514 nm the reflectivity should tend to zero at 0° and $\theta_1$° and for angles of incidence up to about 30° the reflectivity of the mirror coating should tend to 100% at the reading wavelength.

In this specification the term "optical" is intended to refer to that part of the electromagnetic spectrum which is generally known as the visible region together with those parts of the infra-red and ultra-violet regions at each end of the visible region.

We claim:

1. A holographic element comprising: a holographic material supported on a substrate absorbent to light of a recording wavelength to form a composite structure, the holographic material being sensitive to light of the recording wavelength, readable at a reading wavelength and usable to form a volume hologram; a first surface of the substrate having a mirror coating which is reflecting at the reading wavelength and non-reflecting at the recording wavelength, and the mirror coating being interposed in the composite structure at the interface between the substrate and the holographic material whereby light incident on the holographic material when recording a hologram is absorbed in the substrate, and light incident on the holographic material when reading a hologram is reflected at the mirror coating without entering the substrate.

2. A holographic element as claimed in claim 1 wherein the mirror coating is a multi-layer dielectric structure.

3. A holographic element as claimed in claim 1 wherein the mirror coating behaves as a mirror for angles of incidence of up to about 30°, at the reading wavelength.

4. A holographic element as claimed in claim 1 wherein the substrate and the holographic material have substantially the same refractive index, and the mirror coating is adapted for use in a material of that refractive index.

5. A holographic element as claimed in claim 1 wherein the holographic material is dichromated gelatin.

6. A holographic element as claimed in claim 1 wherein the reading wavelength is in the range 1200-1600 nm and the recording wavelength is in the visible region of the electromagnetic spectrum.

7. A holographic element as claimed in claim 1 wherein the volume hologram comprises a grating of slanted fringes.

8. A holographic device comprising a holographic element as claimed in claim 1 wherein a volume hologram has been formed in the holographic material and further comprising a cover glass adjacent the composite substrate structure and attached thereto by adhesive means.

9. A holographic element comprising a substrate absorbent to light of a recording wavelength, and having a first surface, and a holographic material, the holographic material being sensitive to light of the recording wavelength, readable at a reading wavelength and usable to form a volume hologram, the substrate and the holographic material forming a composite substrate structure, characterized in that the first surface of the substrate has a mirror coating and the holographic material is located adjacent the mirror coating which behaves as a mirror for angles of incidence of up to about 30° at the reading wavelength and is non-reflecting at the recording wavelength.

10. A holographic element comprising a substrate absorbent to light of a recording wavelength, and having a first surface, and a holographic material, the holographic material being sensitive to light of the recording wavelength, readable at a reading wavelength and usable to form a volume hologram, the substrate and the holographic material forming a composite substrate structure, characterized in that:
the reading wavelength is in the range 1200-1600 nm and the recording wavelength is in the visible region of the electromagnetic spectrum, the first surface of the substrate having a mirror coating and the holographic material being located adjacent the mirror coating which is reflecting at the reading wavelength and non-reflecting at the recording wavelength.

11. A holographic device comprising a holographic element wherein a volume hologram has been formed in holographic material forming part of a composite substrate structure, and wherein a cover glass adjacent the composite substrate structure is attached thereto by adhesive means, the composite substrate structure further comprising a substrate absorbent to light of a recording wavelength and having a first surface, the holographic material being sensitive to light of the recording wavelength, readable at a reading wavelength and usable to form a volume hologram, and the first surface of the substrate having a mirror coating, the holographic material being located adjacent to the mirror coating which is reflecting at the reading wavelength and non-reflecting at the recording wavelength.

12. A method of forming a holographic element of the type comprising a holographic material supported on a substrate absorbent to light of a recording wavelength, the holographic material being sensitive to light of the recording wavelength, readable at a reading wavelength and usable to form a volume hologram, the method comprising coating a first surface of the substrate with a mirror coating which is reflecting at the reading wavelength and non-reflecting at the recording wavelength, and depositing the holographic material on the mirror coating to form a composite structure in which the mirror coating is sandwiched between the holographic material and the substrate.

13. A method according to claim 12 further comprising the steps of:
exposing the holographic element to light at the recording wavelength to form a volume hologram;
placing a cover glass over the composite substrate structure; and
applying an adhesive to cover glass to fix the cover glass to the composite substrate structure.

14. A method of forming a holographic element of the type comprising a holographic material supported on a substrate absorbent to light of a recording wavelength, the holographic material being sensitive to light of the recording wavelength, readable at a reading wavelength and usable to form a volume hologram in the holographic material, the substrate and the holographic material forming a composite substrate structure, the method comprising coating a first surface of the substrate with a mirror coating which is reflecting at the reading wavelength, and non-reflecting at the recording wavelength depositing the holographic material on the mirror coating, exposing the holographic element to light at the recording wavelength to form a volume hologram, placing a cover glass over the composite substrate structure, and applying an adhesive to the cover glass to fix the cover glass to the composite substrate structure.

* * * * *